United States Patent [19]

Baba et al.

[11] 4,339,560
[45] Jul. 13, 1982

[54] PROCESS FOR POLYMERIZING OLEFINS

[75] Inventors: Kazuo Baba; Kizuku Wakatsuki, both of Ichihara; Tadashi Hikasa, Chiba, all of Japan

[73] Assignee: Sumitomo Chemical Company, Limited, Osaka, Japan

[21] Appl. No.: 165,664

[22] Filed: Jul. 3, 1980

Related U.S. Application Data

[63] Continuation-in-part of Ser. No. 7,844, Jan. 30, 1979, abandoned.

[30] Foreign Application Priority Data

Feb. 2, 1978 [JP] Japan ................................ 53/11157

[51] Int. Cl.$^3$ ......................... C08F 4/64; C08F 10/00
[52] U.S. Cl. ............................... 526/142; 252/429 B; 252/431 R; 526/125; 526/139; 526/141
[58] Field of Search ...................... 252/429 B, 431 R; 526/139, 142, 151

[56] References Cited

U.S. PATENT DOCUMENTS

| | | | |
|---|---|---|---|
| 3,830,787 | 8/1974 | Susa et al. | 526/125 |
| 4,107,414 | 8/1978 | Giannini et al. | 526/125 |
| 4,109,071 | 8/1978 | Berger et al. | 526/125 |
| 4,113,654 | 9/1978 | Mayr et al. | 526/151 |
| 4,134,855 | 1/1979 | Candlin et al. | 526/125 |
| 4,143,223 | 3/1979 | Toyota et al. | 526/125 |
| 4,199,473 | 4/1980 | Timms | 526/142 |
| 4,232,139 | 11/1980 | Minami et al. | 526/142 |
| 4,234,710 | 11/1980 | Moberly et al. | 526/114 |

FOREIGN PATENT DOCUMENTS

| | | | |
|---|---|---|---|
| 2125107 | 12/1971 | Fed. Rep. of Germany | 526/125 |
| 2230752 | 12/1972 | Fed. Rep. of Germany | 526/114 |
| 2633195 | 1/1977 | Fed. Rep. of Germany | 526/125 |
| 51-64586 | 6/1976 | Japan. | |
| 52-78691 | 7/1977 | Japan. | |
| 52-152485 | 12/1977 | Japan. | |
| 52-153896 | 12/1977 | Japan. | |
| 1464909 | 2/1977 | United Kingdom | 526/125 |

OTHER PUBLICATIONS

G. E. Coats, M. L. H. Green, P. Powell, K. Wade; "Principles of Organometallic Chemistry", 1968, Methuen & Co., Ltd., London.

"Hand Book of Organometallic Compound", issued by Asakura Shoten, Tokyo, 1967, pp. 38–41.

*Primary Examiner*—Edward J. Smith
*Attorney, Agent, or Firm*—Birch, Stewart, Kolasch & Birch

[57] ABSTRACT

A process for the polymerization of an olefin which comprises polymerizing an olefin in the presence of a catalyst system consisting essentially of (A) an organoaluminum compound represented by the formula: $AlR_m^1X_{3-m}^1$ wherein $R^1$ is a hydrocarbon group having 1 to 8 carbon atoms, $X^1$ is a halogen atom or an alkoxy group having 1 to 8 atoms and m is a number in the range of 1 to 3, (B) a product prepared by the reaction of (i) a titanium compound selected from the group represented by the formula: $Ti(OR^2)_pX_q^2$ wherein $R^2$ is a hydrocarbon group having 1 to 8 carbon atoms, $X^2$ is a halogen atom and p and q are each a number satisfying the following ranges: $0 \leq p \leq 4$, $0 \leq q \leq 4$ and $p+q=3$ or 4, with (ii) a reaction product in a hydrocarbon solvent of a Lewis base selected from the group consisting of ethers, esters of carboxylic acids and phosphite compounds with a solid organomagnesium halide which is obtained by the reaction of magnesium and a halogenated hydrocarbon compound represented by the formula: $R^3X^3$ wherein $R^3$ is a hydrocarbon group having 1 to 20 carbon atoms and $X^3$ is a halogen atom in an hydrocarbon solvent, and has a general formula: $MgR_l^3X_{2-l}^3$ wherein $R^3$ and $X^3$ are as defined above and $l$ is a number in the range of $1.5 \geq l \geq 0.005$, and optionally (C) an ester of a carboxylic acid in an amount of up to 1 mole per 1 mole of the organoaluminum compound (A).

12 Claims, No Drawings

PROCESS FOR POLYMERIZING OLEFINS

This is a Continuation-in-Part application of Ser. No. 7,844 filed on Jan. 30, 1979, now abandoned.

The present invention relates to an improved process for the polymerization of olefins.

SInce it has been found by Ziegler that a catalyst system comprising an organometallic compound and a transition metal compound is an excellent polymerization catalyst for olefins, various improved catalysts have been proposed. It is known that a reduced product of a transition metal compound with an organometallic compound such as an organoaluminum or organomagnesium compound is used as an olefin polymerization catalyst (Japanese Patent Publication Nos. 495/1960 and 4787/1960). It is also known that an olefin polymerization catalyst is prepared by the reaction of a solid organomagnesium compound with a transition metal compound (Japanese Patent Publication (Unexamined) Nos. 42283/1972, 17585/1973, 17586/1973 and 58095/1974). However, the catalysts obtained by these known methods have a relatively low catalytic activity. It is necessary to remove the catalyst residues from polymers obtained by using such catalysts.

As the result of the present inventors' intensive study on an improved catalyst useful for olefin polymerization, it has been found that a catalyst having an excellent catalytic activity can be prepared by activating an organomagnesium halide with a Lewis base in a hydrocarbon solvent and reacting the resulting activated solid organomagnesium halide with a transition metal compound, wherein the catalyst thus prepared is useful for the preparation of polymer or copolymers of olefins without any extra steps for removal of catalyst residues from the polymerization products.

An object of the present invention is to provide an improved catalyst for polymerization of olefins. Another object of the invention is to provide a process for the polymerization of olefins without any extra steps for removal of catalyst residues. These and other objects and advantages of the invention will be apparent from the following description.

According to the present invention, olefins having 2 to 8 carbon atoms are polymerized in the presence of a catalyst system consisting essentially of (A) an organoaluminum compound represented by the formula: $AlR^1_m X^1_{3-m}$ wherein $R^1$ is a hydrocarbon group having 1 to 8 carbon atoms, $X^1$ is a halogen atom (e.g. chlorine, bromine, iodine) or an alkoxy group having 1 to 8 carbon atoms and m is a number in the range of 1 to 3, (B) a product obtained by the reaction of (i) a titanium compound selected from the group represented by the formula: $Ti(OR^2)_p X^2_q$ wherein $R^2$ is a hydrocarbon group having 1 to 8 carbon atoms, $X^2$ is a halogen atom and p and q are each a number satisfying the following ranges: $0 \leq p \leq 4$, $0 \leq q \leq 4$ and $p+q=3$ or 4, with (ii) a reaction product in a hydrocarbon solvent of a Lewis base selected from the group consisting of ethers, esters of a carboxylic acid and phosphite compounds with the solid organomagnesium halide which is obtained by the reaction of magnesium and a halogenated hydrocarbon compound represented by the general formula: $R^3X^3$ wherein $R^3$ is a hydrocarbon group having 1 to 20 carbon atoms, $X^3$ is a halogen atom in a hydrocarbon solvent, and is represented by the general formula: $MgR^3_l X^3_{2-l}$ wherein $R^3$ and $X^3$ are as defined above and l is a number in the range of $1.5 \geq l \geq 0.005$, and optionally (C) an ester of a carboxylic acid in an amount of up to 1 mole per 1 mole of the organoaluminum compound (A).

Specified examples of the catalyst component (A) are triethylaluminum, triisobutylaluminum, diethylaluminum chloride, di-n-butylaluminum iodide, diisobutylaluminum iodide, diphenylaluminum chloride, ethylaluminum sesquichloride, di-n-butylaluminum ethoxide, diisobutylaluminum ethoxide and the like. Trialkylaluminums represented by the formula: $Al(R^1)_3$ wherein $R^1$ is an alkyl group having 1 to 8 carbon atoms (e.g. methyl, ethyl, propyl, isopropyl, n-butyl, isobutyl, tert-butyl, n-amyl, isoamyl, hexyl, heptyl, octyl), are particularly suitable as the catalyst component (A). Furthermore, a mixture of the trialkylaluminum and dialkylaluminum halide represented by the formula: $Al(R^1)_2 X^1$ where $R^1$ and $X^1$ are as defined above is the most suitable as the catalyst component (A). The mixing ratio of the trialkylaluminum and the dialkylaluminum halide is preferably in the ratio of 4:1 to 1:4 by mole. The organometallic compounds are usually used in an amount of 1 to 10,000 moles, preferably 1 to 5,000 moles, per 1 molar atom of the transition metal contained in the catalyst component (B).

The solid organomagnesium halide used for the preparation of the catalyst component (B) is obtained in the form of a fine particle by reacting a halogenated hydrocarbon compound represented by the formula: $R^3X^3$ wherein $R^3$ is a hydrocarbon group having 1 to 20 carbon atoms, such as an alkyl having 1 to 20 carbon atoms (e.g. methyl, ethyl, propyl, isopropyl, n-butyl, isobutyl, tert-butyl, n-amyl, isoamyl, 2-ethylhexyl), or an aryl having 6 to 20 carbon atoms (e.g. phenyl, tolyl, xylyl, 2,4,6-trimethylphenyl, naphthyl, p-vinylphenyl), $X^3$ is a halogen atom (e.g. chlorine, bromine, iodine) and a metallic magnesium in the presence of iodine as a catalyst in an inert hydrocarbon solvent which substantially does not dissolve the produced organomagnesium halide according to a known process [D. Bryce-Smith and G. F. Cox, J. Chem. Soc., 1175 (1961)]. The solid organomagnesium halide thus prepared is different from so-called Grignard reagents prepared in ether medium, and has a composition represented by the formula: $MgR^3_l X^3_{2-l}$ wherein $R^3$ and $X^3$ are as defined above and l is a number in the range of $1.5 \geq l \geq 0.005$, preferably $1.25 \geq l \geq 0.01$, more preferably $0.98 \geq l \geq 0.02$. Suitable examples of the organomagnesium halide are methyl-, ethyl-, butyl- or octyl-magnesium chloride, bromide, or iodide, naphthylmagnesium chloride, p-tolylmagnesium chloride, 2,4,6-trimethylphenylmagnesium chloride and the like. As the inert hydrocarbon solvent used for preparing these organomagnesium halides, n-hexane, cyclo-hexane, n-heptane, benzene, toluene and the like can be used.

An activation reaction of the solid organomagnesium halide by a Lewis base is carried out, by contacting the solid organomagnesium halide in the form of a slurry with the Lewis base in an inert hydrocarbon solvent (e.g. n-hexane, n-heptane, benzene, cyclohexane, toluene), whereby the reaction of the organomagnesium halide and the Lewis base proceeds in the vicinity alone of the surface of the organomagnesium particles.

Suitable examples of the Lewis base for the activation of the organomagnesium halide are diethyl ether, di-n-propyl ether, di-n-butyl ether, di-iso-amyl ether, anisole, ethyl phenyl ether, diphenyl ether, tetrahydrofuran, dioxane, methyl-, ethyl, butyl-, and phenylbenzoate, methyl-, ethyl-, butyl-, and phenyl-toluate, methyl-, ethyl-, butyl-, and phenyl-p-anisate, methyl-, ethyl-, butyl-, and phenyl-acetate, methyl methacrylate, methyl acrylate, ethyl p-aminobenzoate, dimethyl terephthalate, dioctyl phthalate, triphenyl phosphite, tri-n-butyl phosphite, tritolyl phosphite and the like. These Lewis bases may be used alone or in a mixture of two or more kinds thereof. The Lewis base for the activation is used in an amount of 0.01 to 10 moles, preferably 0.1 to 2 moles, per 1 mole of the organomagnesium halide. The same inert hydrocarbon solvent as used in the preparation of the organomagnesium halide may be used as the solvent for the activation. The reaction temperature of the activation is preferably 0° to 50° C. Since some of the Lewis bases dissolve the organomagnesium halide very well, it is necessary that the Lewis base should be used in such an amount that all amounts of the organomagnesium halide are not dissolved. Under the reaction conditions described above, a very preferable support for a titanium catalyst can be obtained without any milling of the organomagnesium halide.

The solid organomagnesium halide activated in a slurry state is isolated by filtration, and optionally followed by washing with an inert hydrocarbon solvent and again filtered, and then, is subjected to the reaction with the transition metal compound.

The reaction of the activated solid organomagnesium halide (ii) and the titanium compound is carried out at a temperature of −60° to 200° C., preferably 50° to 150° C. The titanium compound is used in an amount of 0.01 to 100 moles, preferably 0.1 to 10 moles, per 1 mole of the organomagnesium halide. When the titanium compound is solid, it may be reacted with the solid organomagnesium halide after dissolving it in an inert hydrocarbon solvent (e.g. n-hexane, n-heptane, benzene, toluene). On the other hand, when the titanium compound is liquid, it may be reacted in the presence or absence of a solvent, preferably in the absence of a solvent. Suitable examples of the titanium compounds are $TiCl_4$, $TiBr_4$, $TiCl_3I$, $TiCl_3Br$, $Ti(O-iso-C_3H_8)_4$, $Ti(OC_2H_5)_4$, $TiCl(O-iso-C_3H_8)_3$, $TiCl_3$, $TiCl_2Br$ and the like. The titanium compounds may be not only a single compound but also a co-crystallized product such as $TiCl_3 \cdot 1/3 AlCl_3$ and also a mixture such as a mixture of $TiCl_4$ and $Ti(OC_2H_5)_4$. Liquid compounds of a halogen-containing titanium are preferred. The same inert hydrocarbon solvents as used in the preparation of the solid organomagnesium halide are suitably used as a solvent.

The content of titanium in the catalyst component (B) obtained by the above process can relatively easily be varied by controlling the reaction conditions, such as reaction temperature, reaction time, amount of reactants, kind of Lewis base and the like.

The catalyst component (C), which is optionally used in the present invention, is an ester of carboxylic acid which may be the same as or different from those used for the activation of the organomagnesium halide as described above.

The catalyst component (C) is used in an amount of up to 1 mole, preferably up to 0.8 mole, per 1 mole of the catalyst component (A).

In the present invention, polymerization of olefins using the present catalyst system is carried out in the same manner as in the case of using ordinary Zieglar-type catalyst systems. That is, the polymerization may be carried out under the conditions as being substantially free from oxygen, water and the like in a vapor phase, or in the form of a dispersion or solution in a suitable inert solvent or a liquid olefin. An inert hydrocarbon having 3 to 20 carbon atoms (e.g. pentane, hexane, heptane, toluene) can be used as the solvent or dispersing medium for the polymerization. The polymerization temperature is 20° to 200° C., preferably 50° to 100° C., and the polymerization pressure is a normal pressure to 100 kg/cm², preferably 2 to 60 kg/cm². The molecular weight of the polymer produced can be somewhat controlled by controlling the polymerization conditions such as polymerization temperature, molar ratio of the catalyst components and the like. The control of the molecular weight of polymer can effectively be done by adding hydrogen to the polymerization system.

The process of the invention can be applied to polymerization of olefins, having 2 to 8 carbon atoms to which Zieglar catalyst systems are applied, for example, homopolymerization of an α-olefin (e.g. ethylene, propylene, butene-1) or copolymerization of ethylene and propylene, propylne and butene-1, ethylene and butene-1, or the like.

The present invention is illustrated by the following Examples but is not limited thereto.

EXAMPLE 1

(1) Synthesis of n-butylmagnesium chloride

In a four-necked flask substituted with nitrogen, dry metallic magnesium powder (22.4 g) and n-butyl chloride (114 ml) were reacted in n-heptane (500 ml) in the presence of iodine (0.02 g) at 90° C. for 7 hours to produce white powdery n-butylmagnesium chloride. After the reaction, the unreacted metallic magnesium was removed from the reaction suspension. The powdery n-butylmagnesium chloride thus obtained was separated by filtration and dried. n-Butylmagnesium chloride contained 22.7% by weight of Mg and 61.3% by weight of Cl.

(2) Synthesis of Catalyst component (B)

n-Butylmagnesium chloride obtained above (4.7 g) was suspended in n-heptane (100 ml), and diisoamyl ether (8.2 ml) was added to the suspension. The resulting slurry was stirred at room temperature (about 25° C.) for 1 hour.

After the reaction (activation of n-butylmagnesium chloride), the slurry was filtered to obtain a solid product. $TiCl_4$ (22.3 ml) was added to the solid product obtained above and the mixture was reacted at 136° C. for 2 hours. After the reaction, the resulting suspension was cooled to room temperature (about 25° C.). The precipitate was washed with n-heptane repeatedly until free $TiCl_4$ disappeared, and the washing n-heptane was removed to obtain a solid catalyst component in the form of a light brown fine powder. The catalyst component was analyzed using fluorescence X-ray. As the result, the catalyst component contained 1.6% by weight of Ti.

(3) Polymerization

Into a 0.1 liter stainless steel autoclave, triethylaluminum (6 mmole), ethyl p-anisate (2 mmole), the solid catalyst component obtained above (21 mg) and liquid propylene (80 ml) were charged, and polymerization was carried out with stirring with a magnetic stirrer at 60° C. for 1 hour.

After the polymerization reaction, unreacted propylene was discharged to obtain powdery polypropylene (13.1 g). A polymer yield (g) per 1 g of the solid catalyst component per 1 hour [$R_p(Y)$] was 624 g—pp/g—cat.hr and a polymer yield (g) per 1 g of Ti contained in the solid catalyst component, per 1 hour [$R_p(Ti)$] was 39,100 g—pp/g—Ti.hr. Thus, the solid catalyst component had an extremely high polymerization activity.

When the produced polypropylene was extracted with boiling n-heptane for 6 hours, the unextracted portion of the produced polypropylene was 84.3% by weight.

COMPARATIVE EXAMPLE 1 n-Butylmagnesium chloride (4.5 g) prepared in the same manner as in Example 1, (1) was reacted with TiCl$_4$ (20.0 ml) in the absence of an organic solvent at 136° C. for 2 hours without activating n-butylmagnesium chloride with a Lewis base.

After completion of the reaction, a solid catalyst component was prepared in the same manner as in Example 1, (2). Ti content was 7.2% by weight.

Propylene was polymerized in the same manner as in Example 1, (3) except using this solid catalyst component to obtain polypropylene (10.3 g), wherein the unextracted portion was 80.8% by weight, $R_p(Y)$ was 412, and $R_p(Ti)$ was 5,700.

EXAMPLES 2 TO 5

Solid catalyst components were prepared in the same manner as in Example 1 except using various Lewis bases as shown in Table 1 for activation of n-butylmagnesium chloride, and the polymerization reaction was carried out in the same manner as in Example 1 except using these solid catalyst components.

Synthetic conditions of these solid catalyst components and polymerization results are shown in the following Table 1 together with those of Example 1 and Comparative Example 1. As seen in Table 1, the activation of n-butylmagnesium chloride with Lewis bases was significantly effective on the polymerization activity.

EXAMPLE 6 n-Butylmagnesium chloride (4.7 g) prepared in the same manner as in Example 1, (1) was suspended in n-heptane (100 ml), and after addition of diisoamyl ether (8.2 ml), the resulting slurry was stirred for 1 hour. After completion of the activation of n-butylmagnesium chloride with diisoamyl ether, the slurry was filtered to obtain a solid product. TiCl$_4$(22.3 ml) was added to the thus obtained solid product and the mixture was reacted at 50° C. for 3 hours. After the reaction, a solid catalyst component having a Ti content of 1.1% by weight was obtained in the same manner as in Example 1, (2).

Propylene was polymerized in the same manner as in Example 1, (3) except using the above-obtained solid catalyst component (20.6 mg). As the result, 10.0 g of polypropylene was obtained. $R_p(Y)$; 485, $R_p(Ti)$; 44,100, unextracted portion; 88.7% by weight.

EXAMPLE 7 n-Butylmagnesium chloride (7.2 g) prepared in the same manner as in Example 1, (1) was suspended in n-heptane (100 ml) and then diisoamyl ether (12.6 ml) and ethyl benzoate (0.89 ml) were further added to the suspension. After the addition, the resulting slurry was stirred for 1 hour. After completion of the activation, the slurry was filtered to obtain a solid product. TiCl$_4$ (34.1 ml) was added to the solid product and the mixture was reacted at 136° C. for 2 hours.

After the reaction, a solid catalyst component having a Ti content of 1.2% by weight was obtained in the same manner as in Example 1, (2).

Propylene was polymerized in the same manner as in Example 1, (3). As the results, 12.7 g of polypropylene powder was obtained. $R_p(Y)$; 627, $R_p(Ti)$; 52,300, unextracted portion; 91.5% by weight.

EXAMPLES 8 and 9

Mixtures of two kind of Lewis base were used to react with the n-butylmagnesium chloride and then the reaction products were reacted with TiCl$_4$ in the same manner as in Example 7. The amounts of the Lewis base, the Ti contents of the catalyst component (B), and the polymerization results are shown in Table 2 together with those of Example 7. The polymerization of propylene was carried out in the same manner as in Example 1, (3).

TABLE 1

| | | Preparation of solid catalyst | | Polymerization (catalyst: TEA; 6 mmole, EPA; 2 mmole) | | | |
|---|---|---|---|---|---|---|---|
| Run No. | Lewis Base for activation | Amount of Lewis Base (ml/g-n-butylmagnesium chloride) | Ti content (% by weight) | Amount of solid catalyst (mg) | Amount of produced pp (g) | Activity (g-gg/g-Ti . hr) | Unextracted portion of pp (% by weight) |
| Example 1 | Diisoamyl ether | 1.7 | 1.6 | 21.0 | 13.1 | 39,100 | 84.3 |
| Example 2 | Di-n-butyl ether | 1.4 | 2.9 | 22.4 | 9.4 | 14,500 | 82.6 |
| Example 3 | Diethyl ether | 1.4 | 1.7 | 22.6 | 24.7 | 60,500 | 84.2 |
| Example 4 | Triphenyl phosphite | 2.7 | 7.0 | 23.8 | 20.8 | 12,500 | 87.9 |
| Example 5 | Ethyl benzoate | 1.2 | 8.0 | 21.2 | 14.7 | 8,700 | 90.8 |
| Comparative Example 1 | None | — | 7.2 | 25.0 | 10.3 | 5,700 | 80.8 |

[Note]:
TEA; Triethylaluminum,
EPA; Ethyl p-anisate,
pp; Polypropylene

TABLE 2

| Run No. | Preparation of solid catalyst | | | Polymerization (catalyst: TEA; 6 mmole, EPA; 2mmole) | | | |
| --- | --- | --- | --- | --- | --- | --- | --- |
| | Lewis Base for activation | Amount of Lewis Base (ml/g-n-butylmagnesium chloride) | Ti content (% by weight) | Amount of solid catalyst (mg) | $R_p(Y)$ | $R_p(Ti)$ | Unextracted portion of pp (% by weight) |
| Example 7 | Diisoamyl ether | 1.75 | 1.2 | 20.2 | 627 | 52300 | 91.5 |
| | Ethyl benzoate | 0.12 | | | | | |
| Example 8 | Diisoamyl ether | 1.74 | 5.0 | 22.3 | 984 | 18400 | 91.0 |
| | Ethyl benzoate | 1.24 | | | | | |
| Example 9 | Diethyl ether | 0.90 | 1.1 | 21.5 | 724 | 66000 | 90.4 |
| | Ethyl benzoate | 0.25 | | | | | |

EXAMPLE 10

Various n-butyl halides were reacted at about 90° C. with dried magnesium powder in dehydrated n-heptane (25 ml per 1 g of magnesium) by using iodine as an initiator under nitrogen gas under the conditions as shown in Table 3. After the reaction, unreacted magnesium powder was removed and the resulting slurry was filtered and dried to give n-butyl magnesium compounds (Compound Nos. 2 to 5) as white powder. The contents of magnesium and halogen atom in the n-butyl magnesium halides are shown in Table 3 together with those of n-butyl magnesium chloride (No. 1) obtained in Example 1, (1).

Based on the analytical results, the content (l) of n-butyl group in the n-butylmagnesium compounds (i.e. the number of l in the formula: $Mg(n\text{-butyl})_l X_{2-l}$ wherein X is a halogen atom) was calculated. As a result, the number of l is in the range of 0.01 to 1.25.

with a Lewis base shown in Table 4 at about 25° C. for one hour. After the reaction, the reaction mixture was filtered to remove the liquid phase. To the residues was added titanium tetrachloride (about 20 ml), and the mixtures were reacted at 136° C. for 2 hours. The reaction mixtures were cooled to room temperature, and the resulting solid substances were separated and washed with n-heptane until free titanium tetrachloride disappeared, and then dried under reduced pressure to give a powdery catalyst components (B).

These catalysts were used for the polymerization of propylene in the same manner as in Example 1, (3) and the polymerization results are shown in Table 4.

COMPARATIVE EXAMPLES 2 and 3

Using the n-butylmagnesium compounds (No. 4 and 5) obtained in Example 10, the catalyst components (B) were obtained in the same manner as in Comparative Example 1. Propylene was polymerized using these

TABLE 3

| | Synthesis of n-butylmagnesium compounds | | | | | | | |
| --- | --- | --- | --- | --- | --- | --- | --- | --- |
| | Reaction | Reaction | n-Butyl halide | | Analytical data | | | |
| Solvent | temperature (°C.) | time (hr) | Kind | mol/g-atom of Mg | Mg(mg-atom/g) | halogen (mg-atom/g) | l* | No. of compound |
| n-Heptane | 90 | 7 | n-Butyl chloride | 1.2 | 9.34 | 17.0 | 0.27 | 1 |
| " | " | 6 | n-Butyl chloride | 1.5 | 9.01 | 17.9 | 0.01 | 2 |
| Methylcyclohexane | " | 4 | n-Butyl chloride | 1.1 | 8.97 | 17.8 | 0.02 | 3 |
| n-Heptane | " | " | n-Butyl chloride and iodide | 0.55 and 0.55 | 7.08 | 5.30 | 1.25 | 4 |
| " | " | " | n-Butyl iodide | 1.0 | 4.48 | 5.24 | 0.83 | 5 |

[Remarks]:
*l means the number of n-butyl group in the general formula: $Mg(n\text{-butyl})_l X_{2-l}$

EXAMPLES 11 to 14 n-Butylmagnesium compounds (Compound Nos. 2 to 5) obtained in the above Example 10 (each about 5 g) were each suspended in n-heptane (100 ml) and reacted catalysts in the same manner as in Example 1, (3) and the results are shown in Table 4.

As seen in Table 4, the reaction of a Lewis base with an organomagnesium halide in a hydrocarbon solvent is very effective to make a high activity catalyst.

TABLE 4

| Run No. | Reaction of (M) and (L) in slurry state | | | Polymerization | | | |
| --- | --- | --- | --- | --- | --- | --- | --- |
| | No. of magnesium compound (M) | Lewis base (L) | | Ti content wt (%) | $R_p(Y)$ g/g-Cat . hr | $R_p(Ti)$ g/g-Ti . hr | Unextracted portion of pp wt (%) |
| | | Kinds | ml/g-(M) | | | | |
| Example 11 | 2 | Diisoamyl ether | 1.7 | 1.7 | 542 | 32000 | 89.4 |
| Example 12 | 3 | " | " | 1.3 | 506 | 39000 | 87.8 |
| Example 13 | 4 | Diethyl ether | 1.4 | 11.0 | 565 | 5100 | 84.3 |
| Example 14 | 5 | " | " | 4.1 | 284 | 6900 | 83.1 |
| Comparative Example 2 | 4 | None | — | 4.2 | 135 | 3200 | 70.3 |
| Comparative | | | | | | | |

TABLE 4-continued

| Run No. | No. of magnesium compound (M) | Lewis base (L) Kinds | ml/g-(M) | Ti content wt (%) | $R_p(Y)$ g/g-Cat . hr | $R_p(Ti)$ g/g-Ti . hr | Unextracted portion of pp wt (%) |
|---|---|---|---|---|---|---|---|
| | Reaction of (M) and (L) in slurry state | | | | Polymerization | | |
| Example 3 | 5 | None | — | 2.1 | 0 | 0 | — |

COMPARATIVE EXAMPLES 4 to 7

A Grignard reagent was prepared by reacting magnesium and n-butyl chloride in dehydrated diethyl ether. The solution of n-butylmagnesium chloride in diethyl ether thus prepared was dried under reduced pressure to give a powder of n-butylmagnesium chloride ether complex.

This n-butylmagnesium compound, commercially available anhydrous magnesium chloride powder were reacted with a Lewis base under the conditions as shown in Table 3. The reaction products were treated with titanium tetrachloride and then subjected to the polymerization of propylene in the same manner as described in Example 1, (2) and (3). The results are also shown in Table 5.

COMPARATIVE EXAMPLE 8

COMPARATIVE EXAMPLE 9

The Comparative Example 8 was repeated except that ethyl benzoate was used instead of diisoamyl ether and the reaction with titanium tetrachloride was carried out by using titanium tetrachloride (50 ml) at 80° C. The catalyst thus obtained was subjected to the polymerization of propylene likewise. The results are also shown in Table 5.

The comparison of the data of Examples 1 to 9 with those of comparative Examples 4 to 9 with a view toward the activity and unextracted portion of polymer suggests that the organomagnesium halide synthesized in a hydrocarbon solvent is more effective for the preparation of a high active catalyst than the organomagnesium compound synthesized in an ether solvent, anhydrous magnesium dihalide, or anhydrous magnesium dihalide pulverized.

TABLE 5

| Run No. | No. of magnesium compound (M) | Lewis base (L) Kinds | ml/g-(M) | Ti content wt (%) | $R_p(Y)$ g/g-Cat . hr | $R_p(Ti)$ g/g-Ti . hr | Unextracted portion of pp wt (%) |
|---|---|---|---|---|---|---|---|
| | | | | | Polymerization | | |
| | Reaction of (M) and (L) in slurry state | | | | | | |
| Comparative Example 4 | n-BuMgCl* | None | — | 8.2 | 547 | 6700 | 89.4 |
| Example 5 | " | Diisoamyl ether | 1.7 | 15.7 | 755 | 4800 | 86.2 |
| Example 6 | MgCl$_2$ | Diisoamyl ether | " | 20.1 | 141 | 700 | 72.3 |
| Example 7 | " | Ethyl benzoate | 1.2 | 16.9 | 297 | 1800 | 82.1 |
| | Co-pulverization of (M) and (L) | | | | | | |
| Example 8 | MgCl$_2$ | Diisoamyl ether | 1.8 | 15.5 | 216 | 1400 | 81.1 |
| Example 9 | " | Ethyl benzoate | 0.34 | 11.4 | 598 | 5200 | 91.0 |

*synthesized in ether solvent

Into a 75 ml stainless steel pot wherein 10 stainless steel balls (diameter: 9.5 mm) were included were charged a commercially available anhydrous magnesium chloride powder (5.37 g) and diisoamyl ether (amount as shown in Table 5), and they were pulverized at 2,000 r.p.m. for 24 hours. The pulverized products were collected and thereto was added titanium tetrachloride (20 ml), and the mixture was reacted at 136° C. for 2 hours. After the reaction, the reaction product was collected, washed with n-heptane and dried under reduced pressure to give a catalyst powder. The catalyst was subjected to the polymerization of propylene in the same manner as described in Example 1, (3). The results are shown in Table 5.

EXAMPLES 15 TO 17

Propylene was polymerized in the same manner as in Example 1, (3) except using various organometallic compounds as shown in Table 6 as catalyst component (A).

The catalyst components used and polymerization results are also shown in Table 6.

As is clear from Table 6, use of a mixture of a trialkylaluminum and a dialkylaluminum halide as the catalyst component (A) gave superior results in catalytic activity and stereoregularity of the produced polymer (unextracted portion) in comparison with the case when only trialkylaluminum was used.

TABLE 6

| Run No. | Component (A) AlR$_3$ (mmole) | Al(C$_2$H$_5$)$_2$Cl (mmole) | Component (C) Ethyl p-anisate (mmole) | Component (B) (mg) | Amount of the produced polypropylene (g) | Activity (g-pp/g-Ti . hr) | Unextracted portion (% by weight) |
|---|---|---|---|---|---|---|---|
| | Catalyst components | | | | Polymerization | | |
| Example 15 | R=C$_2$H$_5$ 4 | 4 | 2 | 20.3 | 17.5 | 53900 | 89.2 |
| Example 1 | R=C$_2$H$_5$ 8 | 0 | 2 | 21.0 | 13.1 | 39100 | 84.3 |
| Example 16 | R=iso-C$_4$H$_9$ 4 | 4 | 2 | 20.4 | 22.2 | 68000 | 89.1 |
| Example 17 | R=iso- | | | | | | |

TABLE 6-continued

| | Catalyst components | | | | Polymerization | | |
|---|---|---|---|---|---|---|---|
| | Component (A) | | Component (C) | | Amount of the | | Unextracted |
| Run No. | AlR$_3$ (mmole) | Al(C$_2$H$_5$)$_2$Cl (mmole) | Ethyl p-anisate (mmole) | Component (B) (mg) | produced polypropylene (g) | Activity (g-pp/g-Ti · hr) | portion (% by weight) |
| | C$_4$H$_9$ 8 | 0 | 2 | 21.2 | 22.8 | 67000 | 80.3 |

EXAMPLE 18

The solid catalyst component (50.1 mg) obtained in Example 3, n-heptane (600 ml), triethylaluminum (4 mmole) diethylaluminum chloride (4 mmole), and ethyl p-anisate (2 mmole) were introduced into a two liter stainless autoclave with stirring under propylene atmosphere. After adding hydrogen (240 Nml) into the autoclave, the autoclave was heated to 60° C. Subsequently, propylene was supplied thereto until the total pressure became 10 kg/cm$^2$G, whereby polymerization was initiated. Propylene was continuously supplied thereto so that the pressure was constantly maintained during the polymerization. Polymerization temperature was controlled at 70° C.

After 4 hours, the polymerization was terminated and the polypropylene powder was separated by filtration and dried at 50° C. under reduced pressure to obtain 119 g of powder. The thus obtained polypropylene was a white powder having a bulk density of 0.37 g/ml and an intrinsic viscosity of 1.21 dl/g (measured in tetralin at 135° C.). The soluble polymer (8.3 g) was obtained from the filtrate. The portion of the insoluble polymer was 93.5% by weight, and the polymerization activity of the catalyst component (B) was 2540 g—pp/g—cat, or 149,000 g—pp/g—Ti.

EXAMPLE 19

The solid catalyst component (10.1 mg) obtained in the same manner as in Example 1, (2), n-heptane (600 ml) and triisobutylaluminum (4 mmole) were introduced into a one liter stainless autoclave with stirring under nitrogen atmosphere. After heating the autoclave to 75° C., hydrogen was added to the autoclave until the pressure became 2 kg/cm$^2$·G. Subsequently, ethylene was supplied thereto until the total pressure became 6 kg/cm$^2$·G, whereby polymerization was initiated. Ethylene was continuously supplied thereto so that the pressure was constantly maintained during the polymerization.

After 1 hour, the polymerization was terminated and the produced polymer was separated by filtration and dried at 50° C. under reduced pressure to obtain 143 g of polyethylene. The thus obtained polyethylene was a white powder having a bulk density of 0.35 g/ml and an intrinsic viscosity of 2.5 dl/g (measured in tetralin at 135° C.). Yield of polyethylene was 887,000 g per 1 g of Ti contained in the solid catalyst component.

What is claimed is:

1. A catalyst system for the polymerization of olefins consisting essentially of
   (A) an organoaluminum compound represented by the formula: AlR$_m^1$X$_{3-m}^1$ wherein R$^1$ is a hydrocarbon group having 1 to 8 carbon atoms, X$^1$ is a halogen atom or an alkoxy group having 1 to 8 carbon atoms and m is a number in the range of 1 to 3, and
   (B) a product prepared by reacting a solid organomagnesium halide which is obtained by the reaction of magnesium and a halogenated hydrocarbon compound represented by the formula: R$^3$X$^3$ wherein R$^3$ is a hydrocarbon group having 1 to 20 carbon atoms and X$^3$ is a halogen atom in an hydrocarbon solvent and has a general formula: MgR$_l^3$X$_{2-l}^3$ wherein R$^3$ and X$^3$ are as defined above and l is a number in the range of $1.25 \geq l \geq 0.01$ with an ether selected from the group consisting of diethyl ether, di-n-propyl ether, di-n-butyl ether, di-isoamyl ether, anisole, ethyl phenyl ether, diphenyl ether, tetrahydrofuran and dioxane in a hydrocarbon solvent at 0° C. to 50° C., the molar ratio of ether to solid organomagnesium halide being in the range of 0.01/1 to 10/1, and reacting the thus obtained activated solid organomagnesium halide with a titanium compound selected from the group represented by the formula: Ti(OR$^2$)$_p$X$_q^2$ wherein R$^2$ is a hydrocarbon group having 1 to 8 carbon atoms, X$^2$ is a halogen atom and p and q are each a number satisfying the following ranges: $0 \leq p \leq 4$, $0 \leq q \leq 4$ and $p+q=3$ or 4, at a temperature of $-60°$ C. to 200° C., the molar ratio of titanium compound to activated organomagnesium halide being in the range of 0.01/1 to 100/1.

2. A catalyst system according to claim 1, wherein said solid organomagnesium halide is a member selected from the group consisting of methyl-, ethyl-, butyl- and octyl-magnesium chloride, bromide and iodide, naphthyl magnesium chloride, p-tolylmagnesium chloride, and 2,4,6-trimethylphenylmagnesium chloride.

3. A catalyst system according to claim 1, wherein l is a number in the range of $0.95 \geq l \geq 0.01$.

4. A catalyst system according to claim 1, wherein the hydrocarbon solvent used for the reaction of an ether with solid organomagnesium halide or the reaction of magnesium and a halogenated hydrocarbon compound is a member selected from the group consisting of n-hexane, cyclohexane, n-heptane, benzene, and toluene.

5. A catalyst system according to claim 1, wherein the amount of the ether is in the range of 0.1 to 2 moles per 1 mole of the organomagnesium halide.

6. A catalyst system according to claim 1, wherein the organoaluminum compound is a trialkylaluminum of the formula: Al(R$^1$)$_3$ wherein R$^1$ is an alkyl group having 1 to 8 carbon atoms.

7. A catalyst system according to claim 1, wherein the organoaluminum compound is a mixture of a trialkylaluminum of the formula: Al(R$^1$)$_3$ and a dialkylaluminum halide of the formula: Al(R$^1$)$_2$X$^1$ wherein R$^1$ is an alkyl group having 1 to 8 carbon atoms and X$^1$ is a halogen atom, in a mixed ratio of the trialkylaluminum to the dialkylaluminum halide of 4:1 to 1:4 by mole.

8. A catalyst system according to claim 1, wherein the titanium compound is titanium tetrachloride.

9. A catalyst system according to claim 1, and further including an ester of a carboxylic acid in an amount of up to 1 mole per 1 mole of the organoaluminum compound (A), wherein the organoaluminum compound (A) is used in an amount of 1 to 10,000 moles per 1 molar atom of titanium atom in the product (B).

10. A process for producing an olefin polymer which comprises polymerizing an olefin having 2 to 8 carbon atoms at 20° to 200° C. under normal pressure to 100 kg/cm$^2$ in the presence of a catalyst system as set forth in anyone of claims 1, 9, 2, 3, 4, 5, 6, 7 or 8.

11. A process according to claim 10, wherein said monomer is a member selected from the group consisting of ethylene, propylene and butene-1.

12. A process according to claim 10, wherein said monomer is a member selected from the group consisting of ethylene and propylene.

* * * * *